(12) United States Patent
Vaghani et al.

(10) Patent No.: US 10,387,042 B2
(45) Date of Patent: Aug. 20, 2019

(54) SYSTEM SOFTWARE INTERFACES FOR SPACE-OPTIMIZED BLOCK DEVICES

(71) Applicant: VMware, Inc., Palo Alto, CA (US)

(72) Inventors: Satyam B. Vaghani, San Jose, CA (US); Tejasvi Aswathanarayana, Malden, MA (US)

(73) Assignee: VMware, Inc., Palo Alto, CA (US)

( * ) Notice: Subject to any disclaimer, the term of this patent is extended or adjusted under 35 U.S.C. 154(b) by 202 days.

(21) Appl. No.: 14/523,578

(22) Filed: Oct. 24, 2014

(65) Prior Publication Data
US 2015/0058523 A1 Feb. 26, 2015

Related U.S. Application Data

(63) Continuation of application No. 13/181,163, filed on Jul. 12, 2011.
(Continued)

(51) Int. Cl.
G06F 9/455 (2018.01)
G06F 3/06 (2006.01)
(Continued)

(52) U.S. Cl.
CPC ............ *G06F 3/0608* (2013.01); *G06F 3/067* (2013.01); *G06F 3/0644* (2013.01);
(Continued)

(58) Field of Classification Search
CPC .................................................. G06F 9/45533
(Continued)

(56) References Cited

U.S. PATENT DOCUMENTS 4,757,438 A * 7/1988 Thatte ................. G06F 12/0253
711/E12.009
5,572,694 A * 11/1996 Uchino ................. G06F 13/122
710/38
(Continued)

FOREIGN PATENT DOCUMENTS

EP 0169005 1/1986
EP 0473802 A1 3/1992
(Continued)

OTHER PUBLICATIONS

Australian Patent Examination Report No. 2 dated Sep. 1, 2015, in counterpart Australian Patent Application No. 2013237716, 7 pages.
(Continued)

Primary Examiner — Mehran Kamran
(74) Attorney, Agent, or Firm — Patterson + Sheridan, LLP

(57) ABSTRACT

Interfaces to storage devices that employ storage space optimization technologies, such as thin provisioning, are configured to enable the benefits gained from such technologies to be sustained. Such an interface may be provided in a hypervisor of a virtualized computer system to enable the hypervisor to discover features of a logical unit number (LUN), such as whether or not the LUN is thinly provisioned, and also in a virtual machine (VM) of the virtualized computer system to enable the VM to discover features of a virtual disk, such as whether or not the virtual disk is thinly provisioned. The discovery of these features enables the hypervisor or the VM to instruct the underlying storage device to carry out certain operations such as an operation to deallocate blocks previously allocated to a logical block device, so that the storage device can continue to benefit from storage space optimization technologies implemented therein.

17 Claims, 12 Drawing Sheets

Related U.S. Application Data

(60) Provisional application No. 61/378,076, filed on Aug. 30, 2010.

(51) Int. Cl.
  *G06F 9/50* (2006.01)
  *G06F 9/48* (2006.01)
  *G06F 12/02* (2006.01)

(52) U.S. Cl.
  CPC .......... *G06F 3/0647* (2013.01); *G06F 3/0664* (2013.01); *G06F 3/0665* (2013.01); *G06F 3/0689* (2013.01); *G06F 9/45558* (2013.01); *G06F 9/4856* (2013.01); *G06F 9/5022* (2013.01); *G06F 12/0253* (2013.01); *G06F 2009/4557* (2013.01)

(58) Field of Classification Search
  USPC .......................................................... 718/1
  See application file for complete search history.

(56) References Cited

U.S. PATENT DOCUMENTS

| | | | | |
|---|---|---|---|---|
| 5,790,852 | A * | 8/1998 | Salm | G06F 12/0223 |
| | | | | 711/147 |
| 5,809,516 | A | 9/1998 | Ukai et al. | |
| 6,125,434 | A * | 9/2000 | Willard | G06F 12/0253 |
| | | | | 707/999.202 |
| 6,564,219 | B1 * | 5/2003 | Lee | G06F 17/30557 |
| | | | | 707/769 |
| 7,065,630 | B1 * | 6/2006 | Ledebohm | G06F 12/1081 |
| | | | | 710/8 |
| 7,231,409 | B1 * | 6/2007 | Chen | G06F 11/1435 |
| 7,334,108 | B1 * | 2/2008 | Case | G06F 12/1045 |
| | | | | 710/26 |
| 7,457,880 | B1 | 11/2008 | Kim | |
| 7,526,623 | B1 * | 4/2009 | Rao | G06F 12/023 |
| | | | | 711/159 |
| 7,567,188 | B1 * | 7/2009 | Anglin | G06F 3/0608 |
| | | | | 341/63 |
| 7,793,307 | B2 | 9/2010 | Gokhale et al. | |
| 7,949,637 | B1 * | 5/2011 | Burke | G06F 3/0605 |
| | | | | 707/655 |
| 8,041,888 | B2 * | 10/2011 | Rajan | G06F 17/30067 |
| | | | | 707/624 |
| 8,156,306 | B1 * | 4/2012 | Raizen | G06F 3/0608 |
| | | | | 707/813 |
| 8,332,612 | B1 * | 12/2012 | Raizen | G06F 3/0608 |
| | | | | 707/813 |
| 8,452,921 | B1 * | 5/2013 | Li | G06F 9/4555 |
| | | | | 711/112 |
| 8,621,145 | B1 | 12/2013 | Kimmel et al. | |
| 8,694,563 | B1 | 4/2014 | Cameron et al. | |
| 9,213,719 | B2 | 12/2015 | Lacapra et al. | |
| 2002/0023156 | A1 | 2/2002 | Chujo et al. | |
| 2002/0129192 | A1 * | 9/2002 | Spiegel | G06F 12/0246 |
| | | | | 711/103 |
| 2002/0161982 | A1 * | 10/2002 | Riedel | G11C 7/1072 |
| | | | | 711/169 |
| 2004/0123017 | A1 * | 6/2004 | Henry | G06F 3/0607 |
| | | | | 711/6 |
| 2005/0216691 | A1 * | 9/2005 | Michael | G06F 9/5016 |
| | | | | 711/170 |
| 2006/0069850 | A1 | 3/2006 | Rudelic | |
| 2006/0085471 | A1 * | 4/2006 | Rajan | G06F 3/0608 |
| 2006/0155775 | A1 | 7/2006 | Yamasaki | |
| 2006/0184565 | A1 * | 8/2006 | Nishikawa | G06F 3/0605 |
| 2007/0067588 | A1 | 3/2007 | Kano et al. | |
| 2007/0078892 | A1 * | 4/2007 | Boyd | G06F 21/78 |
| 2007/0192552 | A1 | 8/2007 | Dutta et al. | |
| 2007/0239944 | A1 * | 10/2007 | Rupangunta | G06F 3/0613 |
| | | | | 711/147 |
| 2008/0016275 | A1 * | 1/2008 | Sebastian | G06F 3/0613 |
| | | | | 711/114 |
| 2008/0077762 | A1 * | 3/2008 | Scott | G06F 3/0608 |
| | | | | 711/170 |
| 2008/0077763 | A1 * | 3/2008 | Steinmetz | G06F 3/0613 |
| | | | | 711/170 |
| 2008/0104359 | A1 * | 5/2008 | Sauer | G06F 3/0608 |
| | | | | 711/202 |
| 2008/0235479 | A1 * | 9/2008 | Scales | G06F 3/0608 |
| | | | | 711/166 |
| 2009/0019245 | A1 | 1/2009 | Bondurant et al. | |
| 2009/0025006 | A1 * | 1/2009 | Waldspurger | G06F 9/5016 |
| | | | | 718/104 |
| 2009/0049261 | A1 * | 2/2009 | Duchesne | G06F 3/061 |
| | | | | 711/162 |
| 2009/0070541 | A1 * | 3/2009 | Yochai | G06F 3/0605 |
| | | | | 711/165 |
| 2009/0077327 | A1 * | 3/2009 | Hara | G06F 3/0608 |
| | | | | 711/154 |
| 2009/0150463 | A1 | 6/2009 | Sekiguchi et al. | |
| 2009/0169020 | A1 * | 7/2009 | Sakthikumar | G06F 21/57 |
| | | | | 380/278 |
| 2009/0172666 | A1 * | 7/2009 | Yahalom | G06F 3/0605 |
| | | | | 718/1 |
| 2009/0217265 | A1 * | 8/2009 | Ishikawa | G06F 9/45504 |
| | | | | 718/1 |
| 2009/0248763 | A1 * | 10/2009 | Rajan | G06F 3/0608 |
| 2009/0271412 | A1 | 10/2009 | Lacapra et al. | |
| 2009/0292870 | A1 | 11/2009 | Sambe et al. | |
| 2009/0313446 | A1 | 12/2009 | Schuba et al. | |
| 2009/0319728 | A1 | 12/2009 | Bakke et al. | |
| 2010/0042797 | A1 | 2/2010 | Asano et al. | |
| 2010/0082900 | A1 | 4/2010 | Murayama et al. | |
| 2010/0153617 | A1 * | 6/2010 | Miroshnichenko | G06F 3/061 |
| | | | | 711/6 |
| 2010/0211944 | A1 * | 8/2010 | Kaneda | G06F 9/44505 |
| | | | | 717/174 |
| 2010/0228903 | A1 | 9/2010 | Chandrasekaran et al. | |
| 2010/0235831 | A1 * | 9/2010 | Dittmer | G06F 9/45558 |
| | | | | 718/1 |
| 2010/0241785 | A1 * | 9/2010 | Chen | G06F 9/5016 |
| | | | | 711/6 |
| 2010/0257331 | A1 * | 10/2010 | Frank | G06F 9/5022 |
| | | | | 711/166 |
| 2010/0275201 | A1 * | 10/2010 | Lunawat | G06F 9/45537 |
| | | | | 718/1 |
| 2010/0306445 | A1 * | 12/2010 | Dake | G06F 3/0604 |
| | | | | 711/6 |
| 2010/0332778 | A1 | 12/2010 | Wada | |
| 2011/0029713 | A1 | 2/2011 | Wade et al. | |
| 2011/0061049 | A1 * | 3/2011 | Kobayashi | G06F 3/0617 |
| | | | | 718/1 |
| 2011/0071986 | A1 | 3/2011 | Schmidt et al. | |
| 2011/0093437 | A1 * | 4/2011 | Sampathkumar | G06F 17/30088 |
| | | | | 707/649 |
| 2011/0107044 | A1 | 5/2011 | Young et al. | |
| 2011/0119763 | A1 * | 5/2011 | Wade | G06F 21/566 |
| | | | | 726/24 |
| 2011/0179082 | A1 * | 7/2011 | Vaghani | G06F 17/30008 |
| | | | | 707/781 |
| 2011/0185140 | A1 * | 7/2011 | Arakawa | G06F 3/0605 |
| | | | | 711/165 |
| 2011/0197022 | A1 * | 8/2011 | Green | G06F 3/0607 |
| | | | | 711/112 |
| 2011/0231594 | A1 | 9/2011 | Sugimoto et al. | |
| 2011/0231596 | A1 | 9/2011 | Goss et al. | |
| 2011/0258378 | A1 * | 10/2011 | Ananthanarayanan | G06F 3/061 |
| | | | | 711/114 |
| 2012/0005450 | A1 * | 1/2012 | Bomma | G06F 3/061 |
| | | | | 711/171 |
| 2012/0011336 | A1 | 1/2012 | Saika | |
| 2012/0017043 | A1 * | 1/2012 | Aizman | G06F 11/1076 |
| | | | | 711/114 |

(56) References Cited

U.S. PATENT DOCUMENTS

| | | | |
|---|---|---|---|
| 2012/0036321 A1* | 2/2012 | Zwisler | G06F 3/0608 711/114 |
| 2012/0047316 A1 | 2/2012 | Post et al. | |
| 2012/0054306 A1 | 3/2012 | Vaghani et al. | |
| 2012/0054410 A1 | 3/2012 | Vaghani et al. | |
| 2012/0054746 A1 | 3/2012 | Vaghani et al. | |
| 2012/0072694 A1* | 3/2012 | Yochai | G06F 3/0605 711/170 |
| 2012/0246405 A1 | 9/2012 | Schroeder et al. | |
| 2013/0339952 A1* | 12/2013 | Li | G06F 9/4555 718/1 |
| 2014/0298326 A1 | 10/2014 | Venkatesan et al. | |
| 2015/0134928 A1* | 5/2015 | Goodman | G06F 3/0655 711/170 |
| 2015/0169230 A1* | 6/2015 | Asnaashari | G06F 3/0688 711/103 |

FOREIGN PATENT DOCUMENTS

| | | |
|---|---|---|
| EP | 0959409 A1 | 11/1999 |
| JP | 61-112255 | 5/1986 |
| JP | 2008102667 A | 5/2008 |
| JP | 2009134601 A | 6/2009 |
| JP | 2009187142 | 8/2009 |
| JP | 2010140273 A | 6/2010 |
| JP | 2011523751 A | 8/2011 |
| JP | 2012-522292 | 9/2012 |
| JP | 2012-523594 | 10/2012 |
| WO | 2009066611 A1 | 5/2009 |
| WO | 2009150122 A1 | 12/2009 |
| WO | 2010111694 A2 | 9/2010 |
| WO | 2011024239 A1 | 3/2011 |

OTHER PUBLICATIONS

Australian Patent Examination Report No. 2 dated Sep. 1, 2015, in counterpart Australian Patent Application No. 2013237715, 6 pages.

Rastogi et al. "Gone, But Not Forgotten: The Current State of Private Computing" http://www.cs.umd.edu/~aseem/pcm.pdf.

Office Action dated Sep. 22, 2015 in counterpart U.S. Appl. No. 13/181,163.

Final Office Action dated Apr. 24, 2014 in counterpart U.S. Appl. No. 13/181,163.

Final Office Action dated May 20, 2014 in counterpart U.S. Appl. No. 13/181,182.

Japanese Office Action dated Sep. 9, 2014, Japanese Patent Application No. 2013-177456, 20 pages (w/ English translation).

Japanese Office Action dated Sep. 2, 2014, Japanese Patent Application No. 2013-177455, 8 pages (English translation).

Yoshida, "Storage Virtualization, Thin Provisioning Becoming A Standard, Which Opens Lead in Pool Design and Release of Area" Nikkei Computer, Feb. 3, 2010 No. 749 pp. 111-115.

Non-Final Office Action dated Jul. 8, 2014 in counterpart U.S. Appl. No. 13/181,153.

Non-Final Office Action dated Dec. 18, 2014 in counterpart U.S. Appl. No. 13/181,182.

Final Office Action dated Jan. 29, 2015 in counterpart U.S. Appl. No. 13/181,153.

European Extended Search Report dated Nov. 17, 2011, European Patent Application No. 11179346.9, 6 pages.

Australian Patent Examination Report No. 1 dated Sep. 21, 2012, Australian Patent Application No. 2011218672, 3 pages.

Japanese Office Action dated Dec. 4, 2012, Japanese Patent Application No. 2011-186106, 21 pages (w/English translation).

NetApp, blog.scottlowe.org, Dec. 30, 2006. "Recovering Data Inside VMs Using NetApp Snapshots" Retrieved on Oct. 31, 2013 from <http://blog.scottlowe.org/2006/12/30/recovering-data-inside-vms-using-netapp-snapshots/>.

Epping, Duncan, Apr. 2, 2009. "Storage Vmotion, exploring the next version of ESX/vCenter" Retrieved on Oct. 31, 2013 from <http://www.yellow-bricks.com/2009/04/02/storage-vmotion-exploring-the-next-version-of-esxvcenter>.

VMware, Apr. 16, 2009. "What is New in VMware vSphere 4: Storage" Retrieved Oct. 31, 2013, from <http://www.vmware.com/files/pdf/VMW_09Q1_WP_vSphereStorage_P10_R1.pdf>.

Symantec-EMC2, May 2009. "EMC Symmetrix V-Max with Veritas Storage Foundation". Retrieved on Oct. 31, 2013, from <http://eval.symantec.com/mktginfo/enterprise/white_papers/b-symmetrix-v-max-storage-foundation-whitepaper.en-us.pdf>.

Dell, Inc. 2008. "Dell/EMC CX4 Virtual Provisioning Overview" Retrieved on May 10, 2014 from http://www.dell.comdownloads/global/products/pvaul/en/cx4_virtual_provisioning_wp.pdf.

Non-Final Office Action dated Feb. 26, 2016 in counterpart U.S. Appl. No. 14/523,584.

Final Office Action dated Aug. 25, 2016 in counterpart U.S. Appl. No. 14/523,584.

* cited by examiner

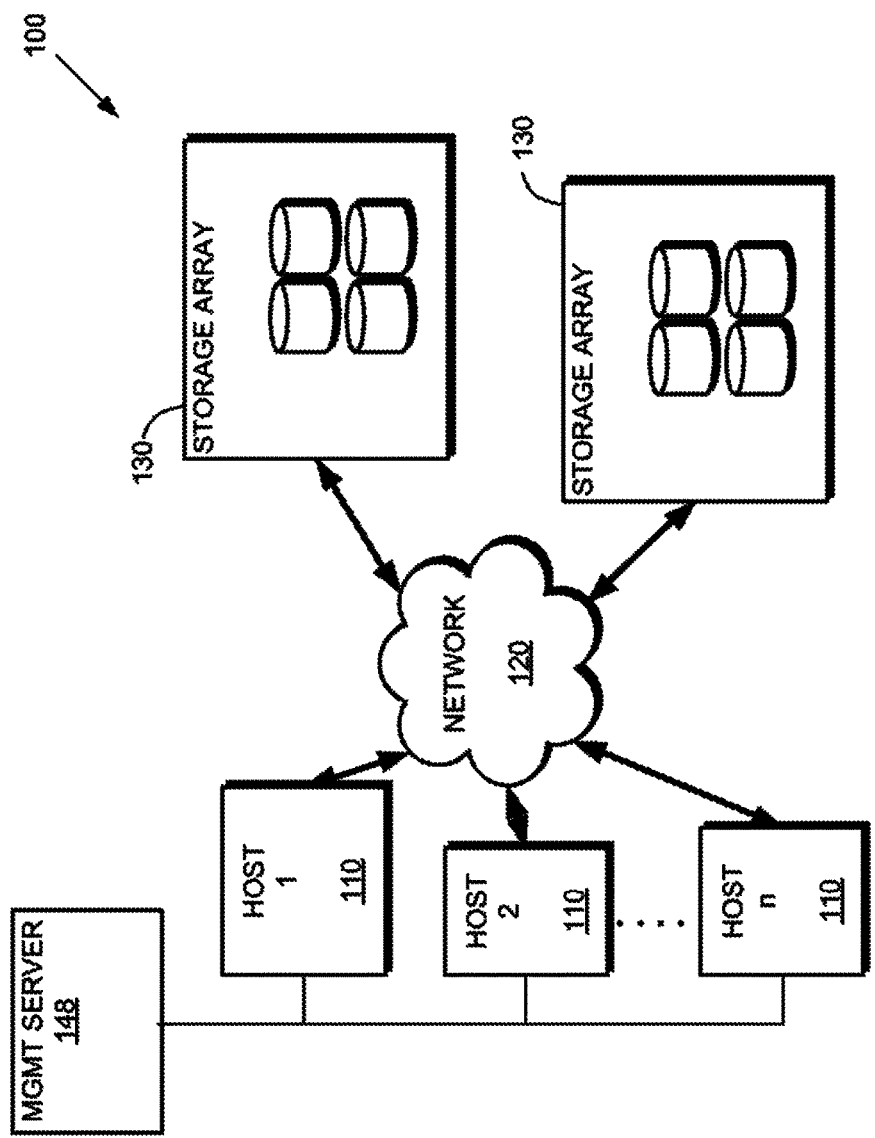

SYSTEM SOFTWARE INTERFACES FOR SPACE-OPTIMIZED BLOCK DEVICES

CROSS-REFERENCE TO RELATED APPLICATION(S)

This application is a continuation of, and claims the benefit of, U.S. patent application Ser. No. 13/181,163, filed on Jul. 12, 2011, now U.S. Pat. No. 9,411,517 issued on Aug. 9, 2016, entitled "SYSTEM SOFTWARE INTERFACES FOR SPACE-OPTIMIZED BLOCK DEVICES," which claims benefit to U.S. Provisional Patent Application No. 61/378,076, filed Aug. 30, 2010, the entire contents of which are incorporated herein by reference.

BACKGROUND

Computer virtualization is a technique that involves encapsulating a physical computing machine platform into a virtual machine that is executed under the control of virtualization software running on a hardware computing platform, or "host." A virtual machine has both virtual system hardware and guest operating system software. Virtual system hardware typically includes at least one "virtual disk," a single file or a set of files that appear as a typical storage drive to the guest operating system. The virtual disk may be stored on the host platform or on a remote storage device. Typically, a virtual machine (VM) uses the virtual disk in the same manner that a physical storage drive is used, to store the guest operating system, application programs, and application data.

The virtualization software, also referred to as a hypervisor, manages the guest operating system's access to the virtual disk and maps the virtual disk to the underlying physical storage resources that reside on the host platform or in a remote storage device, such as a storage area network (SAN) or network attached storage (NAS). Because multiple virtual machines can be instantiated on a single host, allocating physical storage space for virtual disks corresponding to every instantiated virtual machine in an organization's data center can stress the physical storage space capacity of the data center. For example, when provisioning a virtual disk for a virtual machine, the virtualization software may allocate all the physical disk space for the virtual disk at the time the virtual disk is initially created, sometimes creating a number of empty data blocks containing only zeros ("zero blocks"). However, such an allocation may result in storage inefficiencies because the physical storage space allocated for the virtual disk may not be timely used (or ever used) by the virtual machine. In one solution, known as "thin provisioning," the virtualization software dynamically allocates physical storage space to a virtual disk only when such physical storage space is actually needed by the virtual machine and not necessarily when the virtual disk is initially created.

In a similar manner, thin provisioning may be implemented as a storage space optimization technology in the underlying storage hardware, e.g., storage array, which may include an array of rotating disks or solid state disks as the physical storage media. In such cases, a storage system controller that manages the physical storage media and exposes them as logical data storage units, referred to as logical unit numbers (LUNs), to the host, thinly provisions the LUNs. That is, the storage system controller dynamically allocates physical storage space to the LUNs only when such physical storage space is actually needed by the LUNs and not necessarily when the LUNs are initially created. As a result, when the LUNs are initially created, the logical size of each of the LUNs is typically much greater than its physical size.

However, even with the use of thinly-provisioned virtual disks and thinly-provisioned LUNs, storage inefficiencies may be caused by an accumulation of "stale" data, i.e., disk blocks that were previously used and are currently unused but remain allocated. For example, deletion of a file, such as a temporary file created as a backup during editing of a document, in the virtual disk by the guest operating system does not generally result in a release of the actual data blocks corresponding to the temporary file. While the guest operating system may itself track the freed data blocks relating to the deleted temporary file in its own guest file system (e.g., by clearing bits in a bitmap for the guest file system), the guest operating system is not aware that the disk on which it has deleted the temporary data file is actually a "virtual disk" that is itself a file. Therefore, although a portion (i.e., the portion of the virtual disk that stores the guest file system's bitmap of freed data blocks) of the virtual disk may be modified upon a deletion of the temporary file by the guest operating system, the portion of the virtual disk corresponding to actual data blocks of the deleted temporary file does not actually get released from the virtual disk back to the LUN by the virtualization software. This behavior can result in storage inefficiencies because such "stale" portions of the virtual disk are not utilized by the corresponding guest operating system and are also not available to the virtualization software for alternative uses (e.g., reallocated as part of a different virtual disk for a different virtual machine, etc.).

The process known as Storage vMotion™ involving live migration of virtual machine disk files (including one or more virtual disks and other VM configuration files) from a source LUN to a destination LUN provides another example of "stale" data being accumulated in a thinly-provisioned LUN. During Storage vMotion™, actual data blocks corresponding to the virtual machine disk files are copied from the source LUN to the destination LUN, and at the conclusion of the copying, the LUN supporting the VM is atomically switched from the source LUN to the destination LUN. After the atomic switch-over, the actual data blocks corresponding to the virtual machine disk files in the source LUN are no longer needed. While the virtualization software may itself track these data blocks and mark them as "free," for example, by actually deleting the virtual machine disk file from the source LUN, the portion of the source LUN corresponding to these free data blocks of the virtual machine disk file does not actually get released from the LUN back to the storage array. This may be acceptable if the virtualization software quickly reallocates the freed data blocks in the source LUN for alternative uses (e.g., by allocating a new virtual machine disk file for another virtual machine, etc.). However, in cases where the freed data blocks remain unallocated, such "stale" portions of the LUN lessen the storage space efficiencies gained from thin provisioning (e.g., since such stale portions could have been reallocated by the storage array manager to a different thinly provisioned LUN that may be experiencing storage pressure).

SUMMARY

One or more embodiments of the present invention provide system software interfaces to storage devices that employ storage space optimization technologies, such as thin provisioning, to enable the benefits gained from such technologies to be sustained. Such an interface may be provided in a hypervisor of a virtualized computer system to enable the hypervisor to discover features of a LUN, such as whether or not the LUN is thinly provisioned, and also in a VM of the virtualized computer system to enable the VM to discover features of a virtual disk, such as whether or not the virtual disk is thinly provisioned. The discovery of these features enables the hypervisor or the VM to instruct the underlying storage device to carry out certain operations such as an operation to deallocate blocks previously allocated to a logical block device, i.e., the LUN or the virtual disk, so that the underlying storage device can continue to benefit from storage space optimization technologies implemented therein.

A computer system, according to an embodiment of the present invention, includes hardware resources including a processor, memory and a logical block device, and a hypervisor that supports execution of one or more virtual machines and emulates the hardware resources for the virtual machines including an emulated logical block device. The hypervisor includes a component for issuing commands to the logical block device to deallocate storage blocks from the logical block device, and the virtual machines each include a component for issuing commands to the emulated logical block device to deallocate storage blocks from the emulated logical block device.

A method of issuing a command to deallocate free storage blocks previously allocated to a logical block device, according to an embodiment of the present invention, includes the steps of determining that the logical block device supports the command, identifying one or more sets of contiguous storage blocks to be deallocated, and issuing the command to the logical block device based on alignment and granularity values according to which the logical block device performs space reclamation operations, the command identifying at least one set of contiguous storage blocks as storage blocks to be deallocated.

A method of issuing a command to deallocate free storage blocks previously allocated to a logical block device, according to another embodiment of the present invention, includes the steps identifying a set of free blocks to be released from a data structure maintained by a hypervisor of a virtualized computer system, allocating the free blocks in the set to a file and marking the free blocks allocated to the file as used in the data structure, and issuing a command to the logical block device to deallocate the free blocks allocated to the file.

Embodiments of the present invention further include a non-transitory computer-readable storage medium storing instructions that when executed by a computer system cause the computer system to perform one of the methods set forth above.

BRIEF DESCRIPTION OF THE DRAWINGS

FIG. 1 is a block diagram that shows a virtualized computer architecture according to one or more embodiments.

DETAILED DESCRIPTION

Figure 2A:
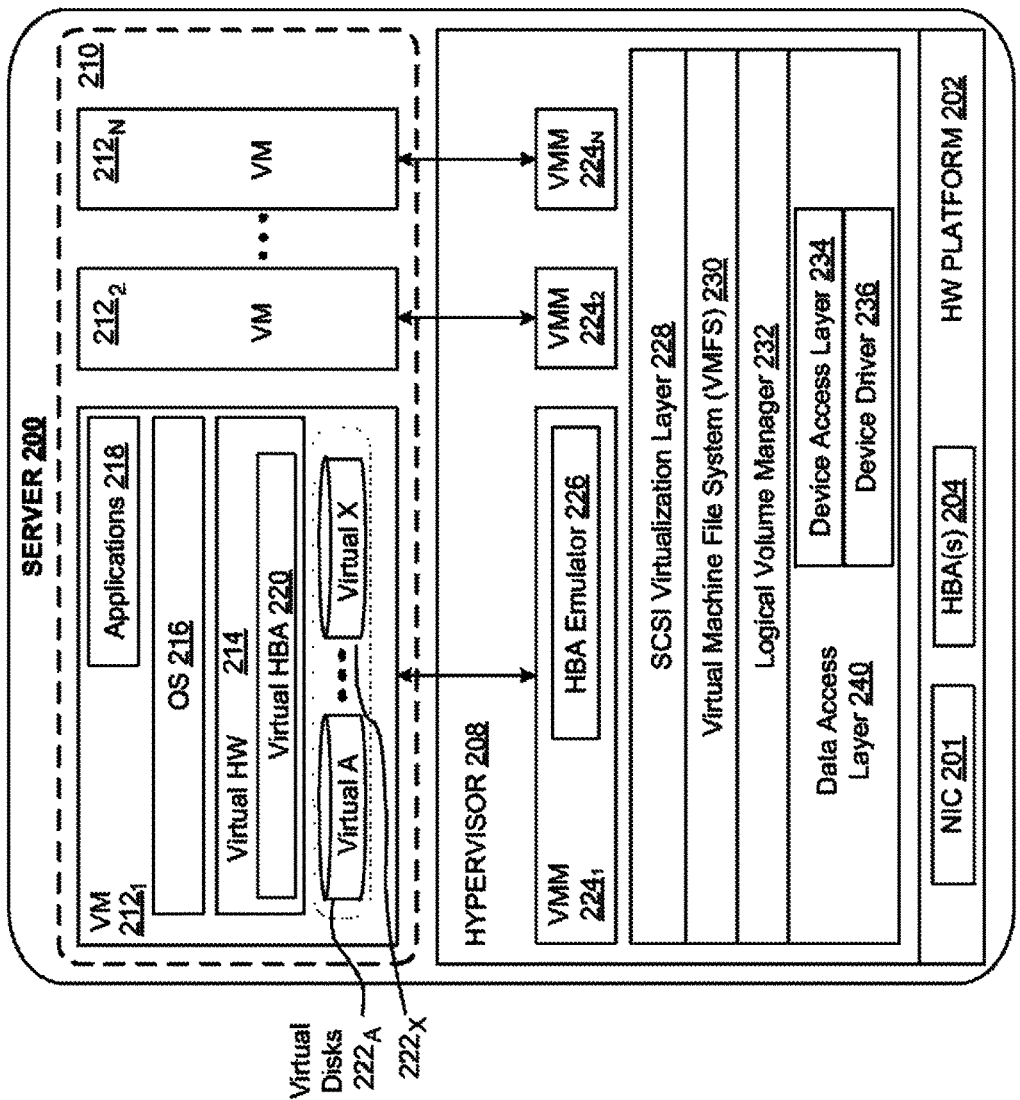
FIG. 2A depicts a block diagram representative of a server in the virtualized computer architecture of FIG. 1, according to one or more embodiments.

FIG. 1 is a block diagram that shows a virtualized computer architecture 100 according to one or more embodiments. Virtualized computer architecture 100 includes a plurality of servers 110 connected through network 120 to a shared storage system that includes one or more storage arrays 130. There may be any number of servers 110, each of which may comprise a general purpose computer system having one or more virtual machines accessing data stored on any number of storage arrays 130. Network 120 may be a wide area network, a local area network, or a network hosting a protocol especially suited for storage arrays 130, such as Fibre Channel, iSCSI, etc., and may comprise one or more of switches. Storage arrays 130 may be of any type such as a network-attached storage (NAS) filer or a block-based device over a storage area network (SAN). While storage arrays 130 are typically made up of a plurality of disks, it should be recognized that as prices for solid-state non-volatile storage devices fall, they are increasingly taking the place of rotating disk storage media. The use of the term, "disk" herein, should therefore not be construed as limited only to rotating disk storage media, but also what is become known as solid state disks, or "SSDs."

Virtualized computer architecture 100 is managed by a management server 148, which is a computer program that resides and executes in a central server or alternatively, in one of servers 110. Management server 148 is in communication with each of servers 110, and carries out administrative tasks for virtualized computer architecture 100 such as load balancing between servers 110 and workload balancing between storage arrays 130.

Figure 2B:
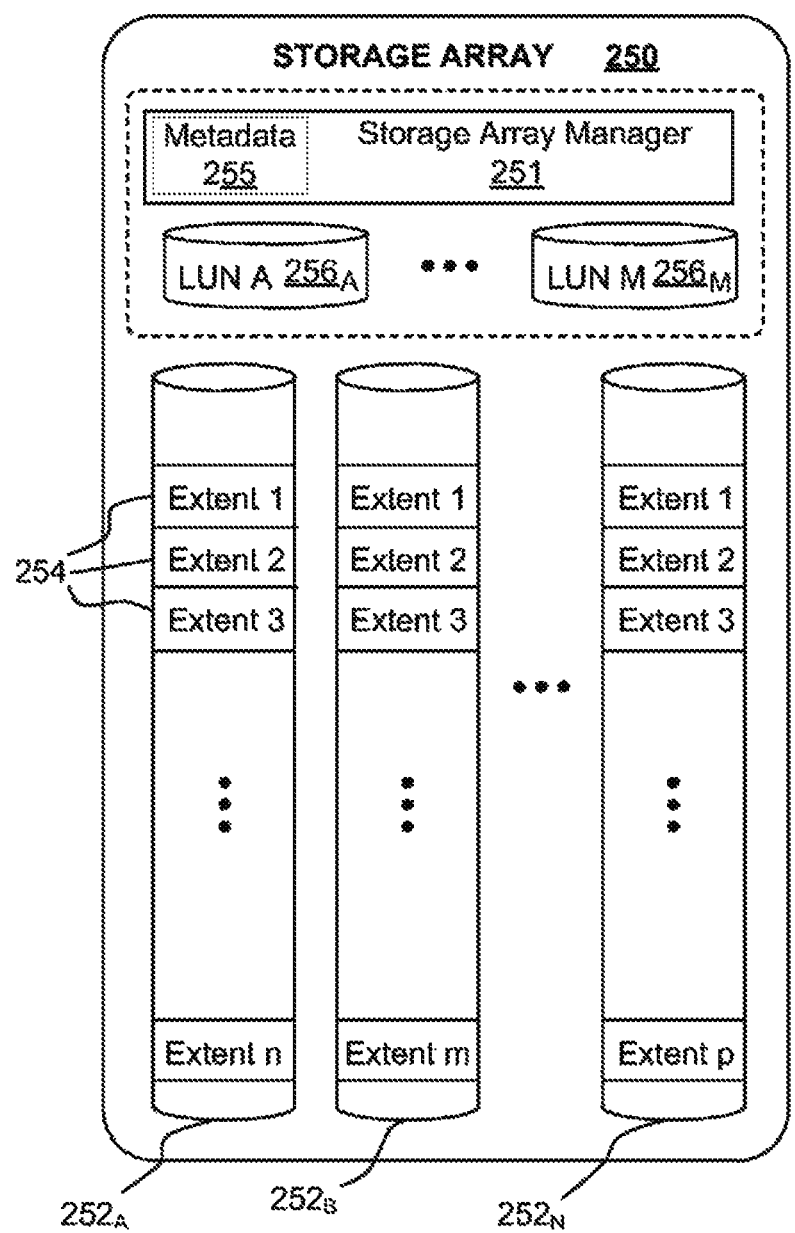
FIG. 2B depicts block diagram representative of a storage array in the virtualized computer architecture of FIG. 1, according to one or more embodiments.

FIGS. 2A and 2B respectively depict block diagrams of a server 200 that is representative of any of servers 110 and a storage array 250 that is representative of any of storage arrays 130, according to one or more embodiments. Server 200 may be constructed on a conventional, typically server-class, hardware platform 202. As shown in FIG. 2A, server 200 includes HBAs 204 and NIC 201 that enable server 200 to connect to storage array 250. As further shown in FIG. 2A, hypervisor 208 is installed on top of hardware platform 202 and it supports a virtual machine execution space 210 within which multiple virtual machines (VMs) $212_1$-$212_N$ may be concurrently instantiated and executed. Each such virtual machine $212_1$-$212_N$ implements a virtual hardware platform 214 that supports the installation of a guest operating system (OS) 216 which is capable of executing applications 218. Examples of a guest OS 216 include any of the well-known commodity operating systems, such as Microsoft Windows, Linux, and the like. In each instance, guest OS 216 includes a native file system layer (not shown in FIG. 2A), for example, either an NTFS or an ext3FS type file system layer. These file system layers interface with virtual hardware platforms 214 to access, from the perspective of guest operating systems 216, a data storage HBA, which in reality, is virtual HBA 220 implemented by virtual hardware platform 214 that provides the appearance of disk storage support (in reality, virtual disks or virtual disks $222_A$-$222_x$) to enable execution of guest OS 216 transparent to the virtualization of the system hardware. In certain embodiments, virtual disks $222_A$-$222_x$ may be thinly provisioned and appear to support, from the perspective of guest OS 216, the SCSI standard for connecting to the virtual machine or any other appropriate hardware connection interface standard known to those with ordinary skill in the art, including IDE, ATA, and ATAPI.

Although, from the perspective of guest operating systems 216, file system calls initiated by such guest operating systems 216 to implement file system-related data transfer and control operations appear to be routed to virtual disks $222_A$-$222_x$ for final execution, in reality, such calls are processed and passed through virtual HBA 220 to adjunct virtual machine monitor (VMM) layers $224_1$-$224_N$ that implement the virtual system support needed to coordinate operation with hypervisor 208. In particular, HBA emulator 226 functionally enables the data transfer and control operations to be correctly handled by hypervisor 208 which ultimately passes such operations through its various layers to true HBAs 204 or NIC 201 that connect to storage array 250. Assuming a SCSI supported virtual device implementation (although those with ordinary skill in the art will recognize the option of using other hardware interface standards), SCSI virtualization layer 228 of hypervisor 208 receives a data transfer and control operation (in the form of SCSI commands, for example, intended for a SCSI-compliant virtual disk) from VMM layers $224_1$-$224_N$, and converts them into file system operations that are understood by virtual machine file system (VMFS) 230 in order to access a file stored in one of the LUNs in storage array 250 under the management of VMFS 230 that represents the SCSI-compliant virtual disk. In one embodiment, the file representing the virtual disk conforms to the VMware Virtual Disk (VMDK) file format promulgated by VMware, Inc. for virtual disks, although it should be recognized that alternative virtual disk file formats may be used in other embodiments.

SCSI virtualization layer 228 then issues these file system operations to VMFS 230. VMFS 230, in general, manages creation, use, and deletion of files (e.g., such as .vmdk files representing virtual disks) stored on LUNs exposed by storage array 250. One example of a clustered file system that can serve as VMFS 230 in an embodiment is described in U.S. Pat. No. 7,849,098, entitled "Multiple Concurrent Access to a File System," filed Feb. 4, 2004 and issued on Dec. 7, 2010, the entire contents of which are incorporated by reference herein. VMFS 230, converts the file system operations received from SCSI virtualization layer 228 to volume (e.g. LUN) block operations, and provides the volume block operations to logical volume manager 232. Logical volume manager (LVM) 232 is typically implemented as an intermediate layer between the driver and file system layers, and supports volume oriented virtualization and management of the LUNs accessible through HBAs 204 and NIC 201. LVM 232 issues raw SCSI operations to device access layer 234 based on the LUN block operations. Data access layer 240 includes device access layer 234, which discovers storage array 250, and applies command queuing and scheduling policies to the raw SCSI operations, and device driver 236, which understands the input/output interface of HBAs 204 and NIC 201 interfacing with storage array 250, and sends the raw SCSI operations from device access layer 234 to HBAs 204 or NIC 201 to be forwarded to storage array 250.

It should be recognized that the various terms, layers and categorizations used to describe the virtualization components in FIG. 2A may be referred to differently without departing from their functionality or the spirit or scope of the invention. For example, VMMs 224 may be considered separate virtualization components between VMs 212 and hypervisor 208 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 214 may be merged with and into VMM 224 such that virtual host bus adapter 220 is removed from FIG. 2A (i.e., since its functionality is effectuated by host bus adapter emulator 226).

Storage array manager 251 of storage array 250, as depicted in FIG. 2B, receives the raw SCSI operations corresponding to one of its LUNs and resolves them into the appropriate extents within the spindles of storage array 250 that are operated upon. Storage array manager 251, which represents one or more programmed storage processors, generally serves as a communication agent (to the outside world) for storage array 250, and implements a virtualization of physical, typically disk drive-based storage units, referred to in FIG. 2B as spindles $252_A$-$252_N$, that reside in storage array 250. From a logical perspective, each of these spindles can be thought of as a sequential array of fixed sized extents 254. Storage array manager 251 abstracts away complexities of targeting read and write operations to addresses of the actual spindles and extents of the disk drives by exposing to server 200 an ability to view the aggregate physical storage space provided by the disk drives as a contiguous logical storage space that may be divided into a set of virtual SCSI block devices previously referred to herein as LUNs $256_A$-$256_M$ ("Logical Unit Numbers"). The virtualization of spindles $252_A$-$252_N$ into such a contiguous logical storage space of LUNs $256_A$-$256_M$ can provide a more efficient utilization of the aggregate physical storage space that is represented by an address space of a logical volume. Storage array manager 251 maintains metadata 255 that includes a mapping (hereinafter, also referred to as an extent-mapping) for each of LUNs $256_A$-$256_M$ to an ordered list of extents, wherein each such extent can be identified as a spindle-extent pair <spindle #, extent #> and may therefore be located in any of the various spindles $252_A$-$252_N$.

In certain embodiments, storage array 250 may employ a storage space optimization technology called "thin provisioning" when allocating LUNs. When a LUN is "thinly" provisioned, the logical size of the LUN as reported by storage array 250 may be larger than the amount of physical space initially backing that LUN. All consumers of the LUN only see the logical size of the LUN. As write operations are issued to previously unallocated blocks of a thin-provisioned LUN, the amount of actual physical space consumed grows, and at some point, the LUN may run out of physical space. In a similar fashion, in a virtualization environment such as that depicted in FIG. 2A, a virtual disk 222 stored on a LUN of storage array 250 may be configured to be "thinly provisioned," for example, by hypervisor 208 (or by management server 148 in certain embodiments). From the perspective of guest OS 216, such a thinly-provisioned virtual disk 222 would be perceived as having a fixed logical size, but, in reality, VMFS 230 allocates LUN storage space to virtual disk 222 (e.g., a .vmdk file) dynamically, such that at any given time, the actual storage space in the LUN that backs virtual disk 222 may be less than the logical size.

Figure 3:
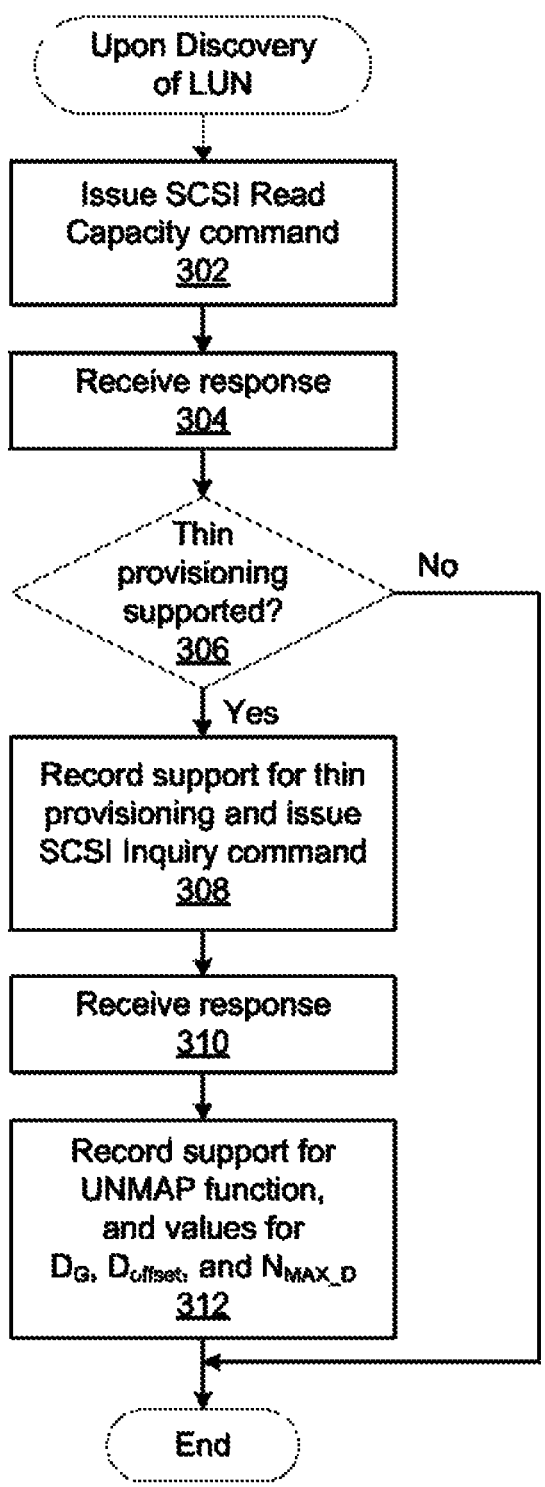
FIG. 3 is a flow diagram illustrating a method to collect configuration characteristics of a LUN that operates as a logical block device of a hypervisor running in the server of FIG. 2A.

FIG. 3 is a flow diagram illustrating a method carried out by hypervisor 208 to collect configuration characteristics of a LUN, which operates as a logical block device for hypervisor 208. These configuration characteristics of the LUN may be used in techniques described below to "reclaim" storage space from the LUN (back to a storage system supporting the LUN, such as storage array 250) by issuing an "UNMAP" command to the LUN. As depicted in FIG. 3, at step 302, hypervisor 208 issues a SCSI Read Capacity command (e.g., 16 bit version of the command) to the LUN. The response of the LUN, received at step 304, includes an indication of whether or not the LUN supports thin provisioning as indicated by the setting of a bit (which, in one embodiment, is known as the "thin provisioning enabled (TPE) bit"). If, at step 306, hypervisor 208 determines that the LUN supports thin provisioning (e.g., the TPE bit is set), the method continues on to step 308. If, at step 306, hypervisor 208 determines that the LUN does not support thin provisioning (e.g., the TPE bit is not set), the method ends.

At step 308, hypervisor 208 records the LUN's support for thin provisioning and issues a SCSI Inquiry command (e.g., utilizing the 0xB0 "Vital Product Data" code as the type of inquiry in one embodiment) to the LUN. The response of the LUN, received at step 310 and recorded at step 312, includes an indication as to whether or not LUN supports an "UNMAP" command (in some embodiments, indicated by a UNMAP "bit") and, if there is support, the response also includes a report of several parameters to be used with UNMAP commands. In its simplest form, in one embodiment, an UNMAP command specifies a list of blocks that are to be unmapped by the LUN and released to the underlying storage system supporting the LUN. In one such embodiment, the parameters reported include $D_G$, a granularity at which the LUN manages data, $D_{offset}$, an alignment parameter expressed at an offset at which the LUN prefers to receive UNMAP commands, and $N_{MAX\_D}$, a maximum number of <offset, length> pairs that can be specified with a single UNMAP command. For example, if $D_{offset}$ has a value of 4 KB, then, the LUN will accept SCSI operations, such as UNMAP commands, that start at a multiple of 4 KB address (e.g., addresses at 0 KB, 4 KB, 8 KB, 12 KB, etc.). If $D_G$ then has a value of 512 KB, then the LUN will accept SCSI operations that specify a block size that is a multiple of 512 KB. In such an example, the LUN would accept an UNMAP command to unmap a contiguous block of 1024 KB that begins at address corresponding to an offset of 12 KB from the beginning of the LUN, but would not accept an UNMAP command to unmap any contiguous block beginning at an address corresponding to an offset of 1 KB, 2 KB, 3 KB, etc. from the beginning of the LUN or where the contiguous block size is less than 512 KB. It should be recognized that the values $D_G$, $D_{offset}$ and $N_{MAX\_D}$ are set or defined by the storage vendor of the underlying storage system supporting the LUN.

Figure 4:
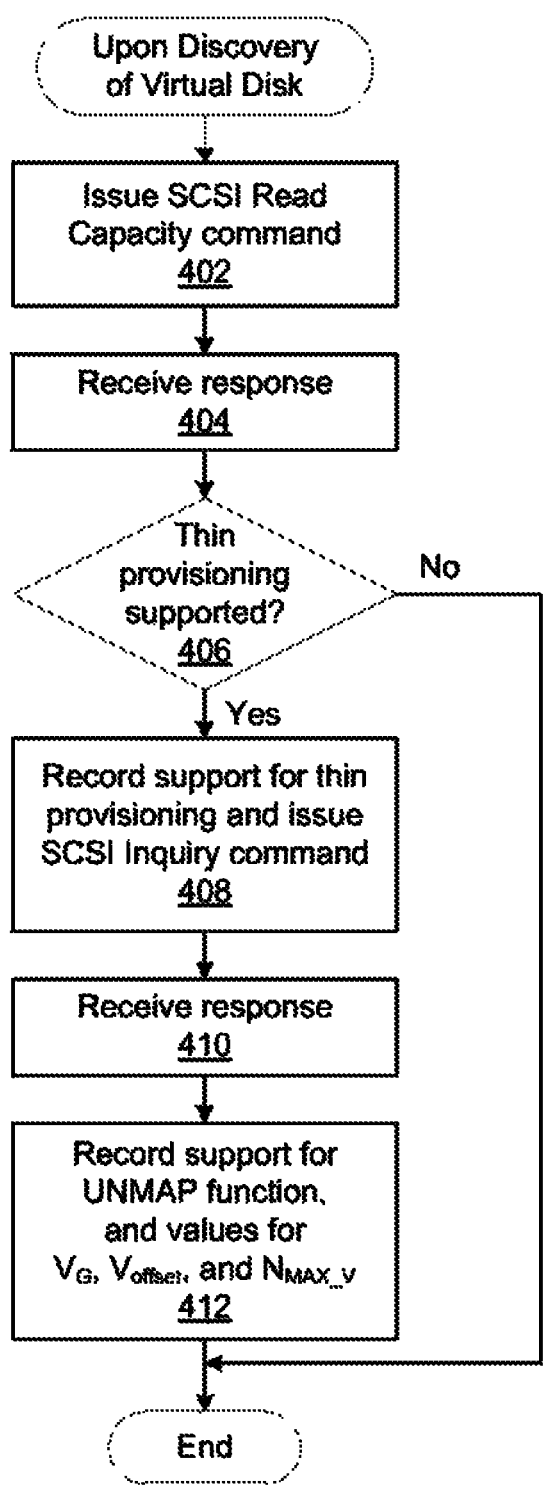
FIG. 4 is a flow diagram illustrating a method to collect configuration characteristics of a virtual disk that operates as a logical block device of a guest operating system of a virtual machine running in the server of FIG. 2A.

FIG. 4 is a flow diagram illustrating a method carried out by guest OS 216 to collect configuration characteristics of a virtual disk 222, which operates as a logical block device of guest OS 216 of virtual machine 212. As should be recognized, FIG. 4 repeats the same steps as FIG. 3, except that rather than a hypervisor querying a LUN in a storage array for its configuration characteristics as in FIG. 3, in FIG. 4, a process in virtual machine 212 (e.g., a user level process developed to track free blocks in guest OS 216 or a configuration routine in a SCSI device driver loaded into guest OS 216, etc.) is querying virtual disk 222 (e.g., an emulated SCSI device whose data is actually stored as a file in the LUN) for its configuration characteristics. Because the virtual disk is being emulated by hypervisor 208, hypervisor 208 provides the virtual disk's configuration characteristics (on behalf of the virtual disk) in response to the querying process in the virtual machine 212. These configuration characteristics of the virtual disk may be used in techniques described below to "reclaim" storage space from the virtual disk back to the LUN in which the virtual disk is stored as a file by issuing an "UNMAP" command to the virtual disk. As depicted in FIG. 4, at step 402, guest OS 216 issues a SCSI Read Capacity command (e.g., 16 bit version of the command) to the virtual disk. The response of the virtual disk, received at step 404, includes an indication of whether or not the virtual disk supports thin provisioning as indicated by the setting of a bit (which, in one embodiment, is known as the "thin provisioning enabled (TPE) bit"). If, at step 406, guest OS 216 determines that the virtual disk supports thin provisioning (e.g., the TPE bit is set), the method continues on to step 408. If, at step 406 guest OS 216 determines that the virtual disk does not support thin provisioning (e.g., the TPE bit is not set), the method ends.

Figure 5:
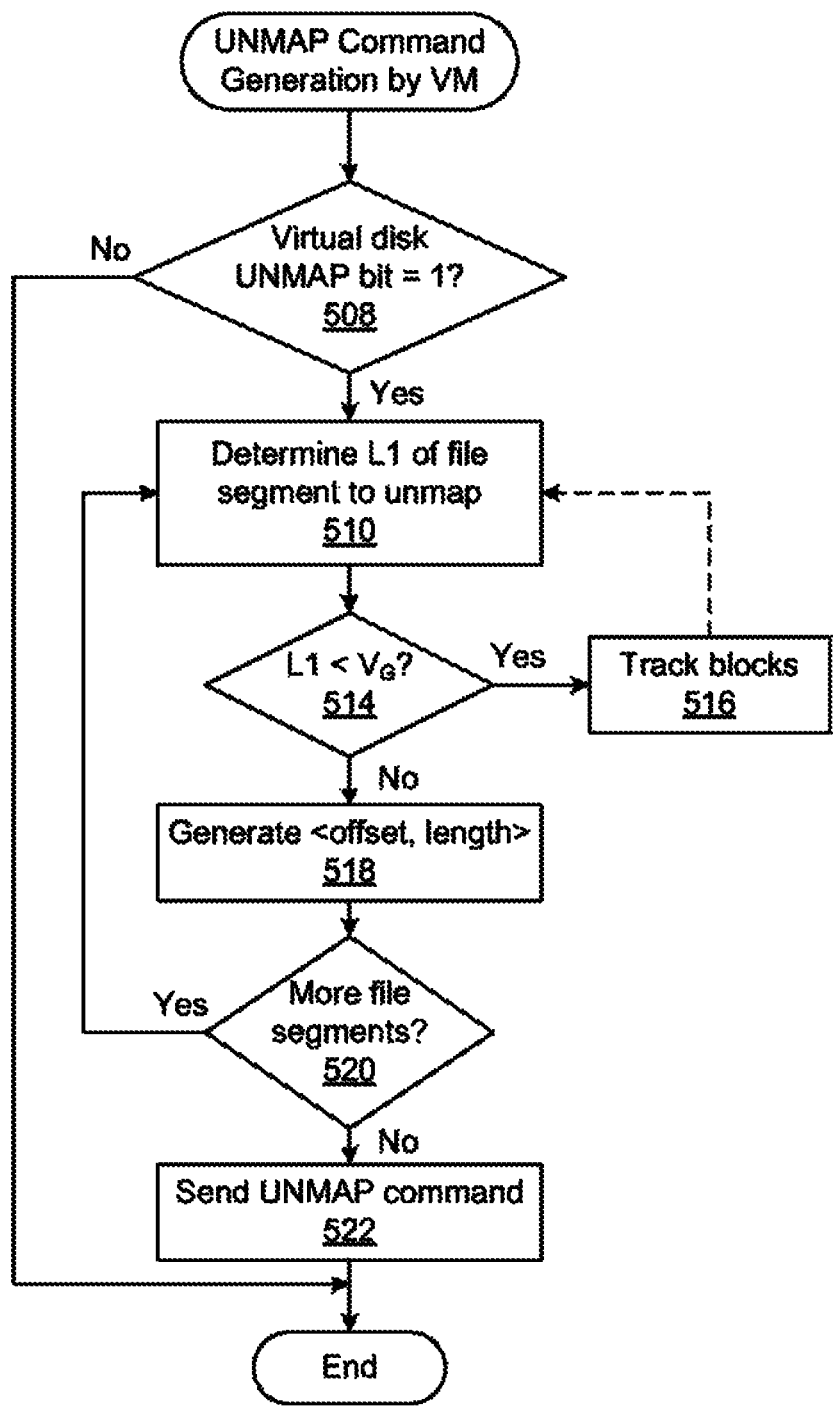
FIG. 5 is a flow diagram that illustrates a method of storage space reclamation from a virtual disk.

At step 408, guest OS 216 records the virtual disk's support for thin provisioning and issues a SCSI Inquiry command (e.g., utilizing the 0xB0 "Vital Product Data" code as the type of inquiry in one embodiment) to the virtual disk. The response of the virtual disk, received at step 410 and recorded at step 412, includes an indication as to whether or not virtual disk supports an "UNMAP" command (in some embodiments, indicated by a UNMAP "bit") and, if there is support, the response also includes a report of several parameters to be used with UNMAP commands. In its simplest form, in one embodiment, an UNMAP command specifies a list of blocks that are to be unmapped by the virtual disk and released to the LUN in which the virtual disk is stored. In one such embodiment, the parameters reported include $V_G$, a granularity at which hypervisor 208 manages data, $V_{offset}$, an alignment parameter expressed as an offset at which hypervisor 208 prefers to receive UNMAP commands, and $N_{MAX\_V}$, a maximum number of <offset, length> pairs that can be specified with a single UNMAP command. $V_G$, and $V_{offset}$, for the virtual disk are analogous to $D_G$, and $D_{offset}$ for the LUN and are thus used similarly to $D_G$, and $D_{offset}$ as previously discussed. FIG. 5 is a flow diagram that illustrates a method of storage space reclamation that is initiated by a VM, e.g., when a VM deletes a file stored in its virtual disk. It should be recognized that a file is represented in the virtual disk (e.g., which itself is a file stored in a LUN) as a series of file blocks which may or may not be contiguous, and that the method of FIG. 5 is performed for each set of contiguous file blocks, referred to herein as a "file segment." In one embodiment, the steps of FIG. 5 are performed by a user-level process developed to monitor and identify free file system blocks relating to deleted files in guest OS 216. For example, such a monitoring process may perform the method of FIG. 5 at periodic intervals upon recognizing free blocks relating to recently deleted files or may be notified by guest OS 216 upon a deletion of a file from the virtual disk. At step 508, the UNMAP bit received in step 410 of FIG. 4 as published by the virtual disk is examined. If this bit is not set, the method ends after such determination. If, at step 508, the UNMAP bit published by the virtual disk is set, the method continues onto step 510 where the length of a file segment of the deleted file (or alternatively, the length of a number contiguous free file system blocks as indicated by guest OS 216) starting at an offset that complies with (e.g., is a multiple of) the offset published by the virtual disk, $V_{offset}$ (the length of such a file segment hereafter being referred to as "L1"), is determined. Therefore, a file segment that is not naturally aligned with $V_{offset}$ is made to align with $V_{offset}$ by carrying out this step. After L1 is determined at step 510, L1 is compared with the granularity published by the virtual disk, $V_G$, at step 514. If L1<$V_G$, then, at step 516, it is determined that the file segment does not include enough contiguous file blocks to support an UNMAP command to the virtual disk and as such, the file blocks of the file segment are remembered (e.g., identifying the file blocks in a special data structure) for possible coalescing with other free blocks that are contiguous with such file blocks that may be subsequently identified by the monitoring process. Step 516 is carried out because the file blocks that are remembered may be contiguous with file blocks from other file segments whose L1 is also less than $V_G$. If so, the file blocks are coalesced for possible inclusion in a single UNMAP command that adheres to the granularity published by the virtual disk. However, the file blocks that are remembered are also monitored for writes (e.g., by the monitoring process), and are no longer remembered (e.g., removed from the special data structure) if a write is issued thereto (since such file blocks would no longer be free for an UNMAP command). As indicated by the dashed arrow to step 510, the length, L1, of coalesced file blocks are determined at step 510. At step 514, L1 is checked once more to see if they meet the condition, L1<$V_G$.

If L1 is greater than or equal to $V_G$, the <offset, length> descriptor for use with the UNMAP command is generated at step 518. Then, at step 520, it is determined whether there are more file segments to process. If there are, the flow returns to step 510. If there are no more, the UNMAP command with a string of one or more <offset, length> descriptors is generated and sent to the virtual disk at step 522. If the number of descriptors generated at step 518 is greater than the maximum number published by the virtual disk, $N_{MAX\_V}$, the UNMAP command is split into multiple UNMAP commands and sent separately to the virtual disk. The method ends after step 522.

For example, if $V_G$=1 MB and $V_{offset}$=4 KB, and a file segment analyzed at step 510 began at an address corresponding to 5 KB from the beginning of the virtual disk and had a length, L1, of 1.5 MB, then the corresponding descriptor for this file segment generated for the UNMAP command would be <8 KB, 1 MB> so that the descriptor complies with the granularity and alignment parameters published by the virtual disk. That is, the virtual disk is unable to unmap the beginning 3 KB portion of the file segment from 5 KB to 8 KB because that portion of the file segment does not begin at an address that is a multiple of $V_{offset}$ (i.e., 4 KB). Similarly, the virtual disk is unable to map the tail portion of the file segment (i.e., approximately the last 0.5 MB) because the tail portion falls within a second 1 MB portion of the file segment and the virtual disk can only unmap in multiples of 1 MB.

Figure 6:
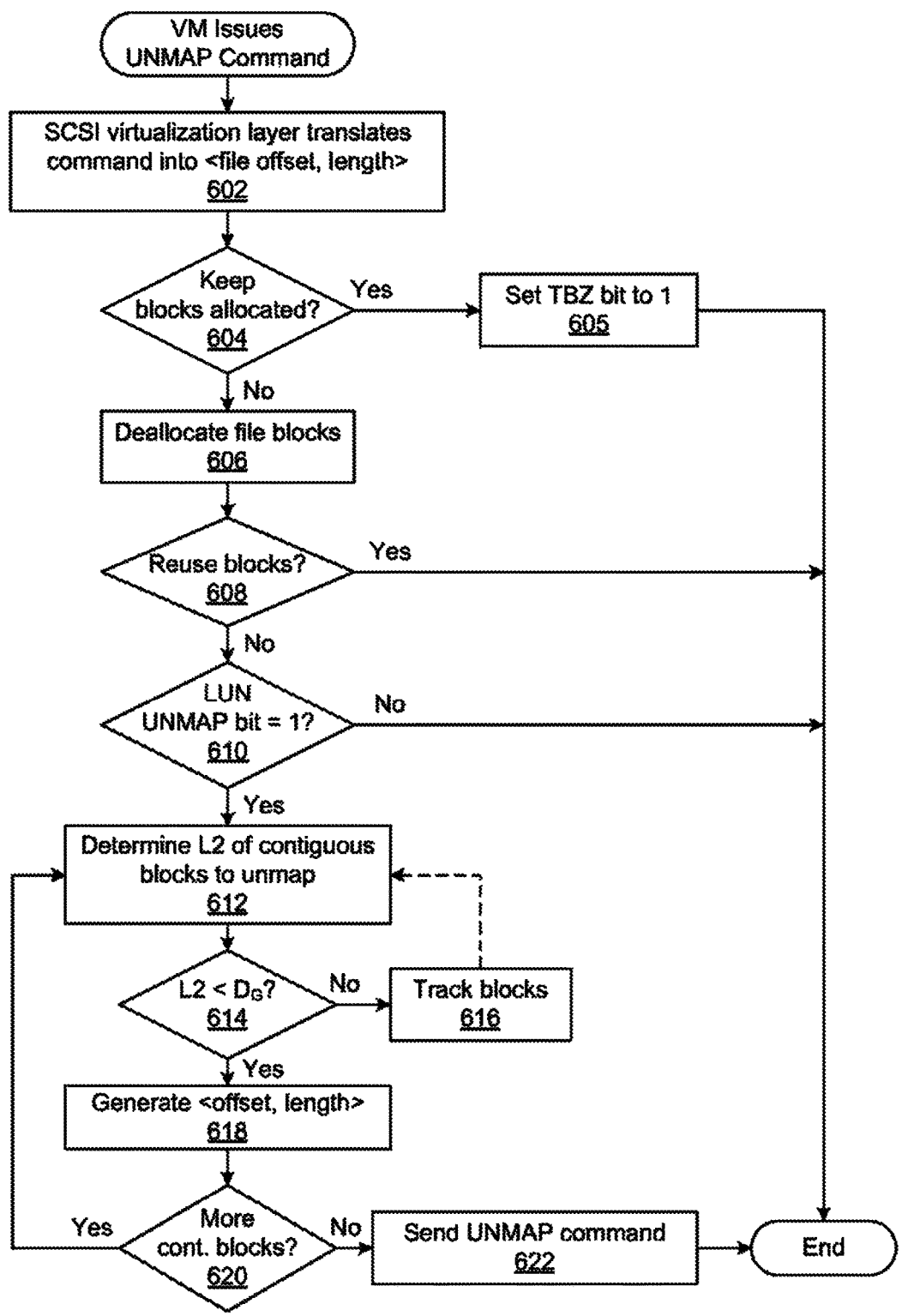
FIG. 6 is a flow diagram that illustrates a method of storage space reclamation from a LUN that is initiated by a hypervisor in response to a command from a VM.

FIG. 6 is a flow diagram that illustrates a method of storage space reclamation that is initiated by hypervisor 208 in response to an UNMAP command from a VM (e.g., as received from step 522 of FIG. 5). At step 602, hypervisor 208, in particular SCSI virtualization layer 228, receives the UNMAP command from the VM on behalf of the virtual disk and translates the UNMAP command into a VMFS file offset and length, which conceptually correspond to a series of VMFS blocks, which may or may not be contiguous. The VMFS blocks are hereafter referred to as free VMFS blocks and each contiguous segment of free VMFS blocks is referred to as a VMFS block segment. Then, a determination is made at step 604 whether the free VMFS blocks should be kept allocated. For example, when a virtual disk is not thinly provisioned and instead is pre-allocated, it would be determined at step 604 to keep the free VMFS blocks allocated. Thus, if the free VMFS blocks should be kept allocated, the metadata (i.e., inode) of the VMFS file that represents the virtual disk is updated so that the free VMFS blocks are indicated as "to be zeroed" as described in U.S. patent application Ser. No. 12/050,805, entitled "Efficient Zeroing of File Data Blocks", filed Mar. 18, 2008, the entire contents of which are incorporated by reference herein. The method ends after step 605. If, on the other hand, it is determined at step 604 that the free VMFS blocks should be deallocated, the free VMFS blocks are deallocated at step 606 from the VMFS file that represents the virtual disk. This deallocation reduces the physical size of the blocks allocated to the virtual disk (as recorded in the inode of the VMFS file corresponding to the virtual disk) even though the logical size remains the same. As part of this deallocation, the bitmap data structure managed by VMFS 230 is updated to indicate the deallocated VMFS blocks are now free. It should be noted that because this deallocation essentially releases free blocks from the virtual disk (e.g., a thinly provisioned virtual disk) back to the LUN, it represents a satisfaction of the UNMAP command from the VM on the virtual disk, as performed by hypervisor 208. However, in certain embodiments, it may be further desired to determine, at this juncture, whether the LUN itself, which has just received free blocks back from the virtual disk and which is a thinly provisioned LUN, may be able to release such free blocks back to its underlying storage array (e.g., so that such free blocks can be utilized by another LUN).

In some embodiments, hypervisor 208 may desire to reuse the free VMFS blocks (e.g., allocate such free blocks to another virtual disk). This check is made at step 608. If it is determined that hypervisor 208 desires to reuse the free VMFS blocks, the method ends. If, on the other hand, it is determined at step 608 that hypervisor 208 does not desire to reuse the free VMFS blocks at the current time, the UNMAP bit published by the LUN that stores the free VMFS blocks is examined at step 610 to determine whether the LUN may be able to release the free VMFS blocks back to its underlying storage array (e.g., so that such free blocks can be utilized by another LUN). If this bit is not set, the method ends after such determination. If, at step 610, the UNMAP bit published by the LUN is set, the method continues onto step 612 where the length of one VMFS block segment starting at an offset that complies with the offset published by the LUN, $D_{offset}$ (the length hereafter being referred to as "L2"), is determined. Therefore, a VMFS block segment that is not naturally aligned with $D_{offset}$ is made to align with $D_{offset}$ by carrying out this step. After L2 is determined at step 612, L2 is compared with the granularity published by the LUN, $D_G$. If $L2<D_G$, then the VMFS blocks in the VMFS block segment are remembered (e.g., identifying the VMFS blocks in a special data structure) for possible coalescing and writes thereto monitored at step 616. Step 616 is carried out because the VMFS blocks that are remembered may be contiguous with VMFS blocks from other VMFS block segments whose L2 is less than $D_G$. If so, the VMFS blocks are coalesced for possible inclusion in a single UNMAP command that adheres to the granularity published by the LUN. However, the VMFS blocks that are remembered are monitored for writes, and are no longer remembered (e.g., removed from the special data structure) if a write is issued thereto. As indicated by the dashed arrow to decision block 612, coalesced VMFS blocks are checked to see if they meet the condition, $L2<D_G$.

If L2 is greater than or equal to $D_G$, the <offset, length> descriptor for use with the UNMAP command is generated at step 618. Then, at step 620, it is determined whether there are more VMFS block segments to process. If there are, the flow returns to step 612. If there are no more, the UNMAP command with a string of one or more <offset, length> descriptors is generated and sent to the LUN at step 622. If the number of descriptors generated at step 618 is greater than the maximum number published by the virtual disk, $N_{MAX\_D}$, the UNMAP command is split into multiple UNMAP commands and sent separately to the LUN. The method ends after step 622.

For example, if one VMFS block segment is described by <8 KB, 1 MB>, and if $D_G=32$ KB and $D_{offset}=16$ KB, the UNMAP command is issued with the descriptor <16 KB, (1 MB−32 KB)> so that the descriptor complies with the granularity and alignment parameters published by the LUN. That is, the LUN is unable to unmap the beginning 8 KB portion of the VMFS block segment from 8 KB to 16 KB because that portion of the file segment does not begin at an address that is a multiple of $D_{offset}$ (i.e., 16 KB). Similarly, the LUN is unable to map the tail portion of the VMFS block segment (i.e., approximately the last 24 KB) because the tail portion is too small to comply with the granularity of 32 KB.

Figure 7:
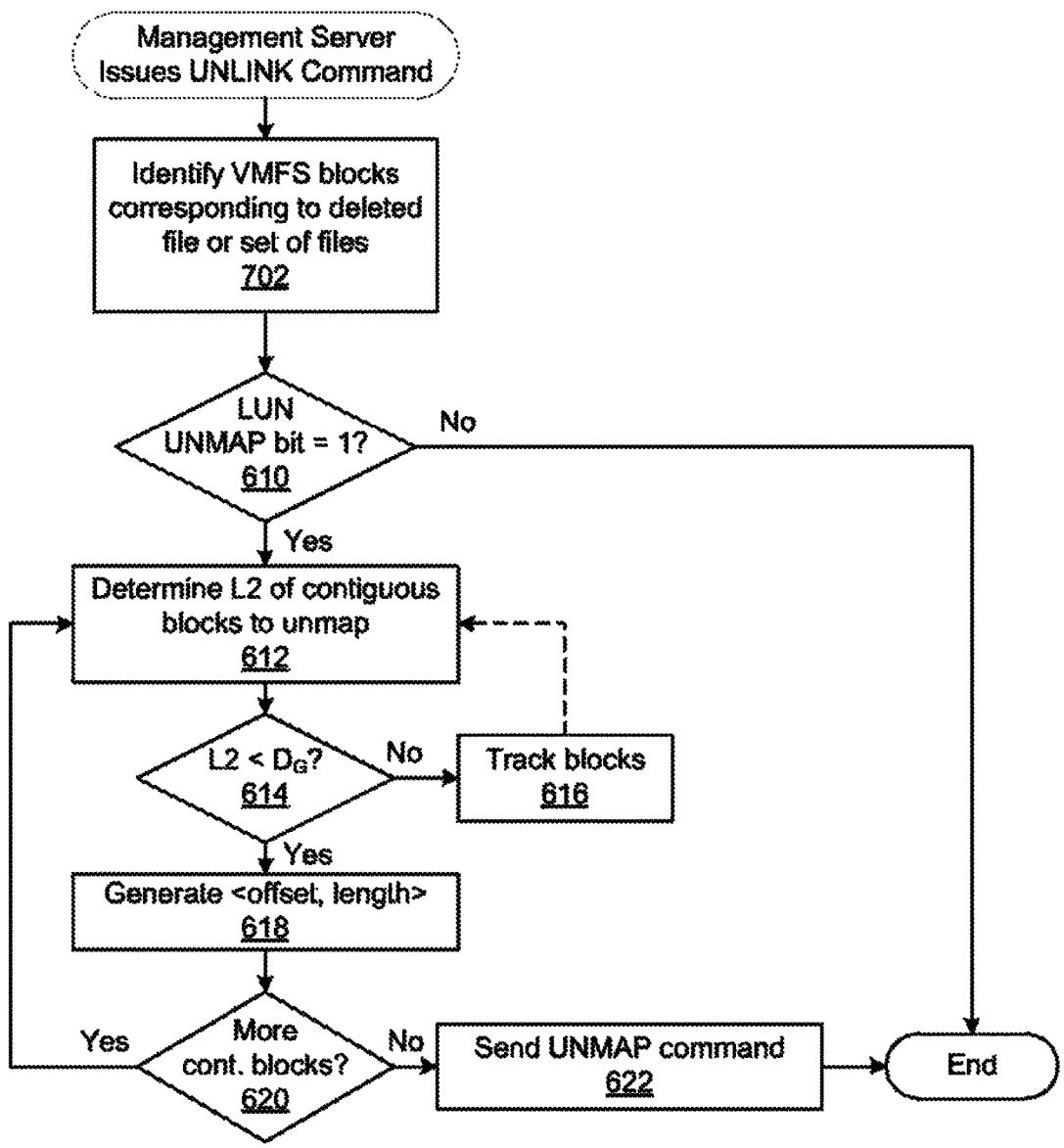
FIG. 7 is a flow diagram that illustrates a method of storage space reclamation from a LUN that is initiated by a hypervisor in response to a command from a management server.

FIG. 7 is a flow diagram that illustrates a method of storage space reclamation that is initiated by hypervisor 208 in response to an UNLINK command from management server 148. The UNLINK command is issued to inform hypervisor 208 to delete a file or set of files that are maintained by VMFS 230 and to issue an UNMAP command to deallocate the VMFS blocks corresponding to these files. For example, after Storage vMotion™ is carried out, as a result of which a set of files (e.g., comprising or including a virtual disk, for example) associated with a VM has been migrated from a source LUN to a destination LUN, the UNLINK command may be issued by management server 148 to delete the files and deallocate the VMFS blocks corresponding to these files, from the source LUN. This method begins at step 702, where hypervisor 208 identifies the VMFS block segments corresponding to the deleted file or deleted set of files by examining the inodes of the file or files. The remaining steps illustrated in FIG. 7 are identical to the same numbered steps of FIG. 6 and reference is made to the description given above for these steps.

Figure 8:
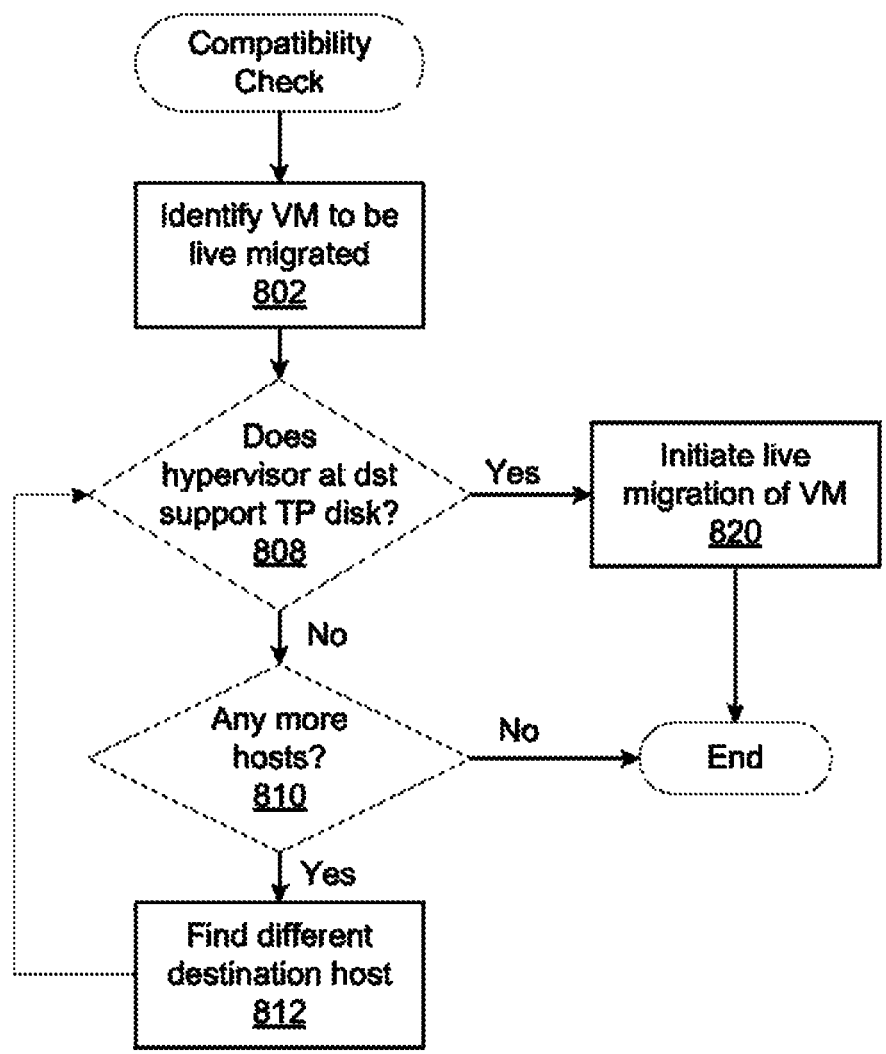
FIG. 8 is a flow diagram that illustrates a method of performing compatibility checks prior to initiating a process to live migrate a VM.

FIG. 8 is a flow diagram that illustrates a method of performing compatibility checks prior to initiating a process to live migrate a VM from a source host to a destination host. These compatibility checks are carried out by management server 148 because a VM that is supported by a thinly provisioned virtual disk should preferably not be migrated to a hypervisor on the destination host that is not capable of providing thinly provisioned virtual disks with UNMAP support. These checks may be performed in various ways including checking the version number of the hypervisor. For example, if the version number of the hypervisor on the destination host is greater than or equal to the lowest version number of the hypervisor that supports thin provisioning, live migration from the source host to the destination host is permitted. Live migration is disallowed otherwise.

Referring to FIG. 8, at step 802, the VM to be live migrated is identified. It is assumed for purposes of illustration that this VM is supported by a thinly provisioned virtual disk. At step 808, a check is made to see if the hypervisor on the destination host also supports thinly provisioned virtual disks. In one embodiment, this check is made based on version numbers as described above. If the check fails, the method loops through steps 810 and 812 until a destination host with a compliant hypervisor is found. If there are no compliant hypervisors, the method terminates. If a compliant hypervisor is found, live migration of the VM is initiated by management server 148 at step 820.

Figures 9, 10:
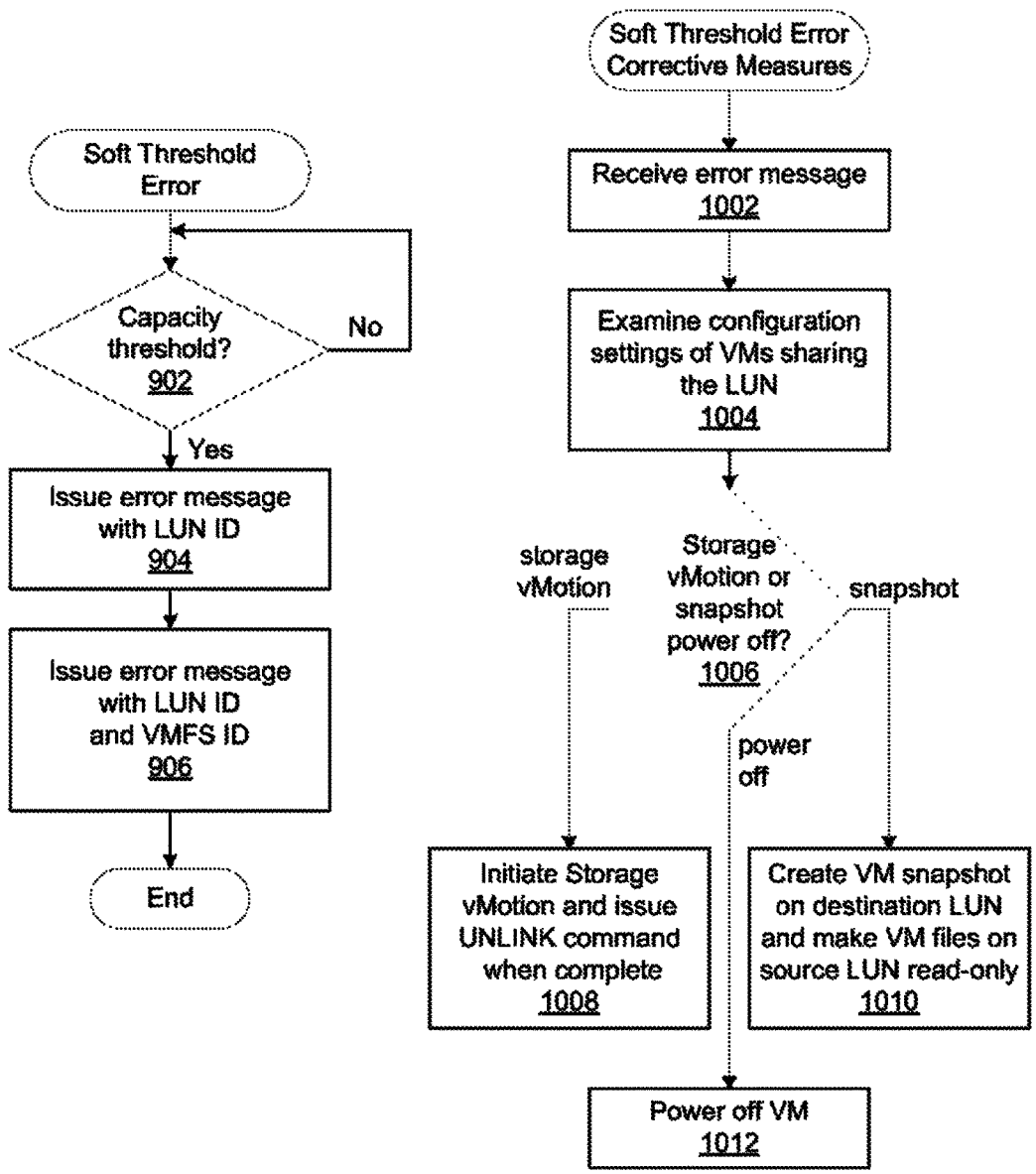
FIG. 9 is a flow diagram that illustrates a method of notifying a management server of a virtualized computer system that a LUN has reached a certain threshold in used capacity.
FIG. 10 is a flow diagram that illustrates a method of performing corrective measures by a management server upon receiving the notification in FIG. 9.

FIG. 9 is a flow diagram that illustrates a method of notifying management server 148 that a LUN has reached a certain threshold in used capacity. This notification is given so that management server 148 can employ remedial measures such as provisioning more space to the LUN, deleting unused files stored in the LUN using the UNLINK command, or migrating workloads (e.g., virtual disks of VMs) from the LUN to another LUN, followed by invoking the UNLINK command on the migrated workloads. Steps 902 and 904 are carried out by the storage array. Step 906 is carried out by the hypervisor.

Step 902 shows that the storage array is continually monitoring whether a LUN's storage capacity has reached or passed a certain threshold level. If it determines that this condition is met, it issues a soft error message to the hypervisor at step 904 with the LUN ID. For example, any write operation to the LUN that results in the LUN exceeding its threshold level causes the storage array to issue the soft error message to the hypervisor. At step 906, the hypervisor, upon receiving this soft error message, issues a soft error message to management server 148. The soft error message includes the LUN ID and the VMFS ID so that management server 148 can employ remedial measures noted above.

FIG. 10 is a flow diagram that illustrates a method of performing corrective measures by management server 148 upon receiving the soft error message generated in step 906 of FIG. 9. At step 1002, management server 148 receives the soft error message. Then, at step 1004, management server 148 examines configuration settings of VMs that are supported by the LUN that is nearing capacity. According to embodiments of the present invention, one of the configuration settings that can be specified upon deployment of a VM is what remedial measures should be taken when the LUN supporting the VM is nearing capacity. Three of the choices are Storage vMotion™, snapshot, and power off. After the decision block at 1006, step 1008 is executed if Storage vMotion™ is specified in such a setting; step 1010 is executed if snapshot is specified in such a setting; and step 1012 is executed if power off is specified in such a setting. At step 1008, management server 148 initiates Storage vMotion™ between the source LUN (i.e., the LUN nearing capacity) and the destination LUN. After completion of Storage vMotion™, the UNLINK command is used to delete the migrated files from the source LUN. At step 1010, a snapshot of the VM files is created on a destination LUN and the VM files on the source LUN is marked read-only. At step 1012, management server 148 powers off the VM.

If no remedial measures are employed or they are deployed too slowly, or in spite of the remedial measures being deployed, the LUN may run out of space when executing a write operation. Under this condition, a hard error message is issued by the storage array. This error message includes an ID of the write operation that caused the error condition so that the VM that issued the write operation can be taken down until more space is provisioned to the LUN or additional space in the LUN is reclaimed. By taking down only the VM that caused the error, VM isolation is preserved and the other VMs that are employing the same LUN for storage can remain operational.

Figure 11:
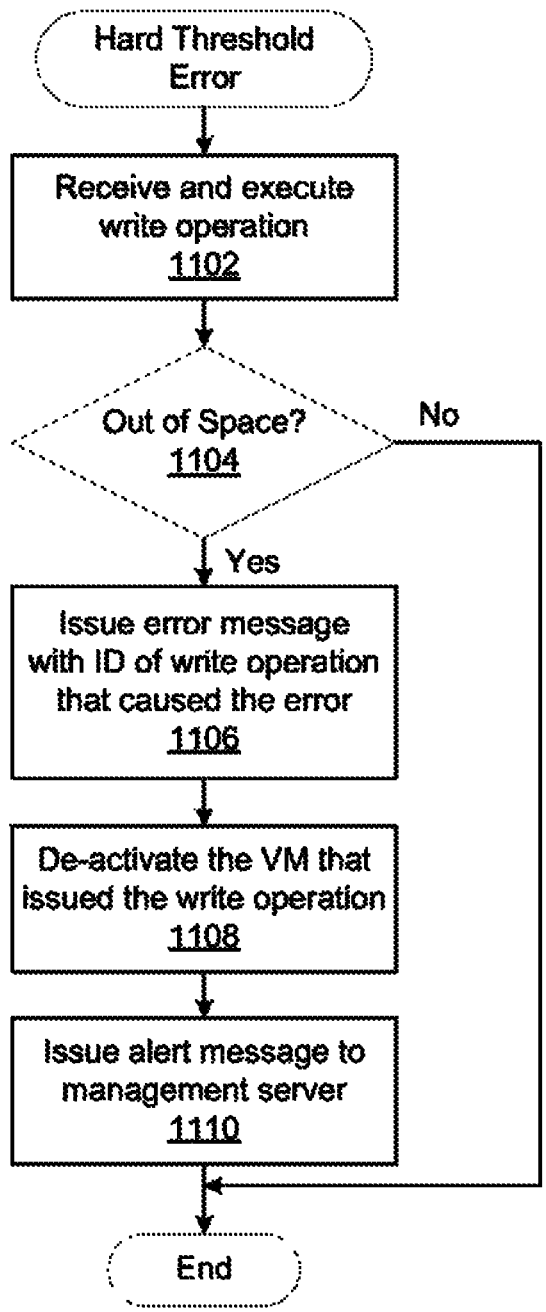
FIG. 11 is a flow diagram that illustrates a method of detecting and handling an error caused when a LUN runs out of space while performing a write operation.

FIG. 11 is a flow diagram that illustrates a method of detecting and handling an error caused when a LUN runs out of space while performing a write operation. Steps 1102, 1104, and 1106 are carried out by the storage array. Step 1108 is carried out by the hypervisor. At step 1102, the storage array receives and executes a write operation on the LUN. If during execution of the write operation, the LUN runs out of space as determined at decision block 1104, a hard error message is issued to the hypervisor at step 1106. The error message includes an ID of the write operation that caused the error. At step 1108, the hypervisor deactivates the VM that issued the write operation. As under normal circumstances, the deactivation of the VM will result in an alert message being transmitted to management server 148, and management server 148 can implement remedial measures in response thereto before reactivating the VM that has been deactivated. The remedial measures include provisioning more space to the LUN, and reclaiming additional space in the LUN by way of migrating the virtual disk of the VM that has been deactivated (or even virtual disks of other VMs) to another LUN, followed by invoking the UNLINK command on the migrated virtual disks, powering off certain VMs, or deleting other files.

Figure 12:
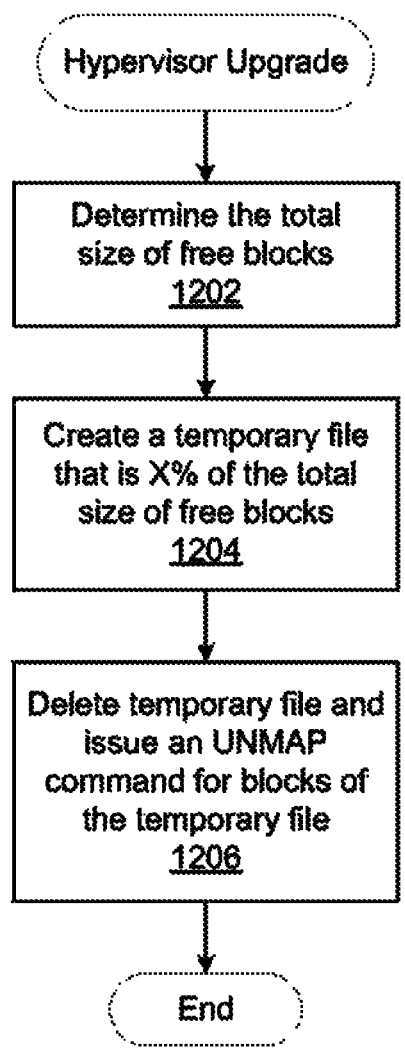
FIG. 12 is a flow diagram that illustrates a method of retroactively reclaiming storage space from a LUN.

FIG. 12 is a flow diagram that illustrates a method of retroactively reclaiming storage space from a LUN that operates as a logical block device for a hypervisor that has been upgraded from a version that does not have the system software interface according to one or more embodiments of the present invention to a version that does. This method is carried out after the hypervisor upgrade has been carried out. At step 1202, the hypervisor determines the total size of its free VMFS blocks in the LUN. At step 1204, the hypervisor creates a temporary file that is X % of the total size of its free VMFS blocks in the LUN. At step 1206, the temporary file is deleted and the hypervisor issues an UNMAP command for all blocks of the temporary file. As a result, the bitmap that the hypervisor maintains to track usage of all VMFS blocks is updated so that the VMFS blocks corresponding to the temporary file are indicated as free in the bitmap. The X % parameter is configurable and if equal to 100%, all of the hypervisor's free VMFS blocks will be deallocated from the LUN, reducing the physical size of the LUN to its theoretical minimum. However, during the time the method of FIG. 12 is carried out, there may be writes to the LUN that require additional space. Therefore, a certain amount of space, which can be determined empirically, is kept free to handle such writes.

In one or more embodiments of the present invention, the commands issued by the hypervisor to the LUN and by the guest operating system to the virtual disk, including SCSI Read Capacity and SCSI Inquiry, and errors issued by the storage array to the hypervisor, such as the soft error described in conjunction with FIG. 9 and the hard error described in conjunction with FIG. 11, are part of the set of commands and error codes in the T10 SCSI protocol.

Although one or more embodiments have been described herein in some detail for clarity of understanding, it should be recognized that certain changes and modifications may be made without departing from the spirit of the invention.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of issuing a command to deallocate free storage blocks previously allocated to a logical block device, comprising:
   determining that the logical block device supports the command;
   requesting, from the logical block device, a granularity of the logical block device, wherein the granularity of the logical block device is a minimum size at which the logical block device performs space reclamation operations;
   receiving, from the logical block device, the granularity;
   identifying a set of contiguous storage blocks to be deallocated;
   determining a total size of the set of contiguous storage blocks to be deallocated and comparing the total size to the granularity of the logical block device; and
   identifying the set of contiguous storage blocks in a data structure and not issuing the command to the logical block device until the total size is greater than the granularity of the logical block device at which time the command is issued to the logical block device.

2. The method of claim 1, further comprising:
   coalescing two or more sets of contiguous storage blocks that are identified in the data structure; and
   issuing another command to the logical block device, said another command identifying the coalesced sets of contiguous storage blocks as storage blocks to be deallocated.

3. The method of claim 1, further comprising:
   detecting a write operation on a storage block identified in the data structure; and removing the storage block from the data structure.

4. The method of claim 1, wherein the logical block device is a logical unit number (LUN) to which a hypervisor of a virtualized computer system is interfaced.

5. The method of claim 4, wherein the hypervisor supports execution of one or more virtual machines and receives from a virtual machine a request to deallocate guest storage blocks from a virtual disk for the virtual machine.

6. The method of claim 5, further comprising:
   identifying storage blocks of the LUN corresponding to the guest storage blocks to be deallocated.

7. The method of claim 6, wherein the identified storage blocks of the LUN correspond to the one or more sets of contiguous storage blocks to be deallocated.

8. The method of claim 6, wherein the identified storage blocks of the LUN are indicated as to be zeroed.

9. The method of claim 6, wherein the identified storage blocks of the LUN are indicated as free in a bitmap of storage blocks of the LUN maintained by the hypervisor.

10. The method of claim 4, further comprising:
    performing live migration of virtual machine files stored in the LUN to another LUN, wherein the virtual machine files are stored in the set of contiguous storage blocks to be deallocated.

11. The method of claim 1, wherein the logical block device is a virtual disk for a virtual machine, and the virtual disk is represented as at least one file in a logical unit number (LUN).

12. A non-transitory computer readable storage medium comprising instructions executable by a computer system to carry out a method of issuing a command to deallocate free storage blocks previously allocated to a logical block device, said method comprising:
    determining that the logical block device supports the command;
    requesting, from the logical block device, a granularity of the logical block device, wherein the granularity of the logical block device is a minimum size at which the logical block device performs space reclamation operations;
    receiving, from the logical block device, the granularity;
    identifying a set of contiguous storage blocks to be deallocated;
    determining a total size of the set of contiguous storage blocks to be deallocated and comparing the total size to the granularity of the logical block device; and
    identifying the set of contiguous storage blocks in a data structure and not issuing the command to the logical block device until the total size is greater than the granularity of the logical block device at which time the command is issued to the logical block device.

13. The non-transitory computer readable storage medium of claim 12, wherein the method further comprises:
    coalescing two or more sets of contiguous storage blocks that are identified in the data structure; and
    issuing another command to the logical block device, said another command identifying the coalesced sets of contiguous storage blocks as storage blocks to be deallocated.

14. A computer system comprising:
    a processor;
    memory; and
    a logical block device, wherein the processor is programmed to perform a method of issuing a command to deallocate free storage blocks previously allocated to the logical block device, the method comprising:
    determining that the logical block device supports the command;

requesting, from the logical block device, a granularity of the logical block device, wherein the granularity of the logical block device is a minimum size at which the logical block device performs space reclamation operations;

receiving, from the logical block device, the granularity;

identifying a set of contiguous storage blocks to be deallocated;

determining a total size of the set of contiguous storage blocks to be deallocated and comparing the total size to the granularity of the logical block device;

identifying the set of contiguous storage blocks in a data structure and not issuing the command to the logical block device until the total size is greater than the granularity of the logical block device at which time the command is issued to the logical block device identifying the set of contiguous storage blocks in a data structure and not issuing the command to the logical block device until the total size is greater than the granularity of the logical block device at which time the command is issued to the logical block device.

15. The system of claim 14, wherein the method further comprises:

coalescing two or more sets of contiguous storage blocks that are identified in the data structure; and issuing another command to the logical block device, said another command identifying the coalesced sets of contiguous storage blocks as storage blocks to be deallocated.

16. The system of claim 14, wherein the method further comprises:

detecting a write operation on a storage block identified in the data structure; and removing the storage block from the data structure.

17. The system of claim 14, wherein the logical block device is a logical unit number (LUN) to which a hypervisor of a virtualized computer system is interfaced.

* * * * *